March 1, 1932.　　H. A. MUSHAM　　1,847,355
HYDRAULIC BRAKE
Filed Dec. 30, 1926　　3 Sheets-Sheet 1
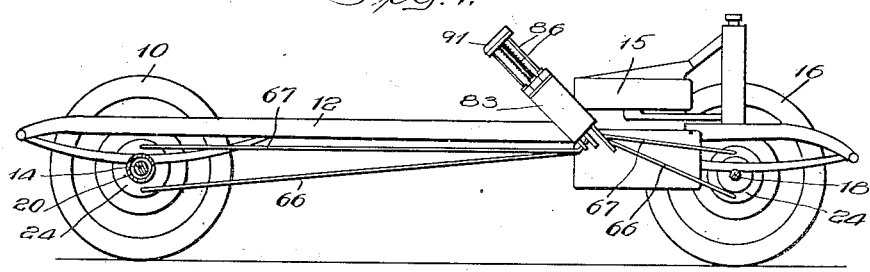
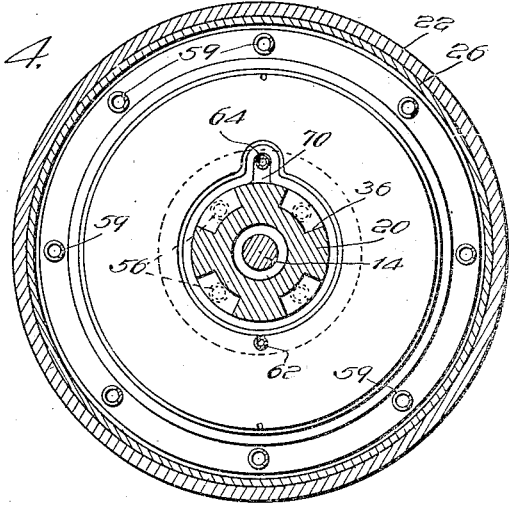
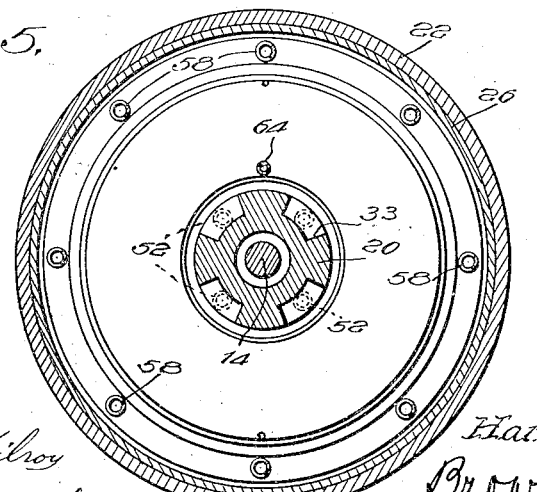

March 1, 1932. H. A. MUSHAM 1,847,355
HYDRAULIC BRAKE
Filed Dec. 30, 1926 3 Sheets-Sheet 2

Witnesses:
William P. Kilroy
Harry R. L. White

Inventor:
Harry A. Musham
By Brown, Bretcher
& Sienni
Attys

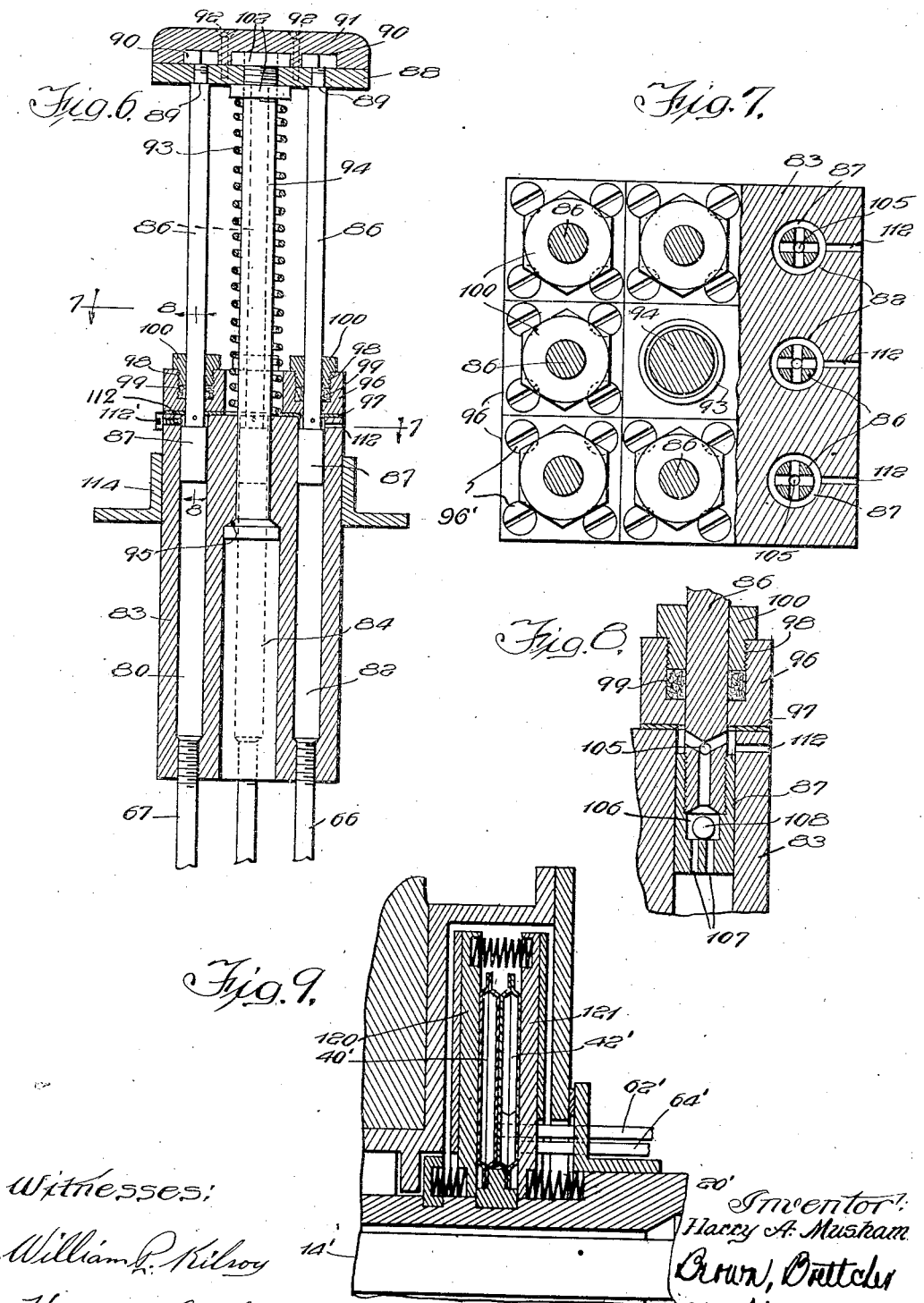

Patented Mar. 1, 1932

1,847,355

UNITED STATES PATENT OFFICE

HARRY A. MUSHAM, OF CHICAGO, ILLINOIS, ASSIGNOR TO HERMAN C. HEATON, OF CHICAGO, ILLINOIS,

HYDRAULIC BRAKE

Application filed December 30, 1926. Serial No. 157,929.

This invention relates to hydraulic brakes and may be characterized as an improvement upon the braking device illustrated and described in the co-pending application of Herman C. Heaton, Serial No. 459,570, filed April 8, 1921 upon which Patent No. 1,640,545 was granted August 30, 1927.

In the brakes at present commonly employed on motor vehicles, the effective braking areas have been more or less limited and in hydraulic braking systems, if one or more of the pressure or fluid transmission or brake actuating lines ruptures or leaks, the associated brake or the entire brake system fails.

Where mechanical brakes have been employed, the mechanical transmissions thereto have acquired a relatively large number of parts and relatively complicated mechanisms for increasing the force applied by the operator, and it has been undesirable to further increase the number of parts or the complexity of the mechanism required.

The objects of the present invention are to provide a generally improved and simplified system having a greater or larger effective braking area and having safety means for preventing, upon rupture or leakage of one or more of the pressure or fluid transmissions or brake actuating lines, failure of the associated brake or of the entire system. I provide, in effect, a hydraulic safety brake which is adapted to be economically produced and which better assures the driver of having a suitable brake at hand at all times. The braking area is increased without materially increasing the required space and the operation is simple and positive at all times.

Another object is the provision of improved pressure or operating means for the brakes, in which the pressure is adapted to be conveniently supplied and in which interference with the return of the pedal or other operating means or locking or rendering of the brake ineffective, is prevented.

While the invention is particularly applicable to four wheel brake systems, it is not limited thereto and may be embodied where only two brakes are employed or in any other suitable or preferred system.

The invention is illustrated in the accompanying drawings in which

Fig. 1 is a fragmentary side view of the running gear of an automobile, illustrating in a more or less diagrammatically way the application thereto of a brake system embodying the present invention;

Fig. 4 is a section taken on the line 4—4 of Fig. 2;

Fig. 5 is a section taken on the line 5—5 of Fig. 2;

Fig. 6 is a longitudinal section through a suitable pressure supply or operating means;

Fig. 7 is a transverse section taken substantially on the line 7—7 of Fig. 6;

Fig. 8 is an enlarged section through one of the pistons of the pressure supply device taken on the line 8—8 of Fig. 6; and Fig. 9 is a fragmentary section similar to Fig. 2 of another embodiment of the invention.

Figure 2:
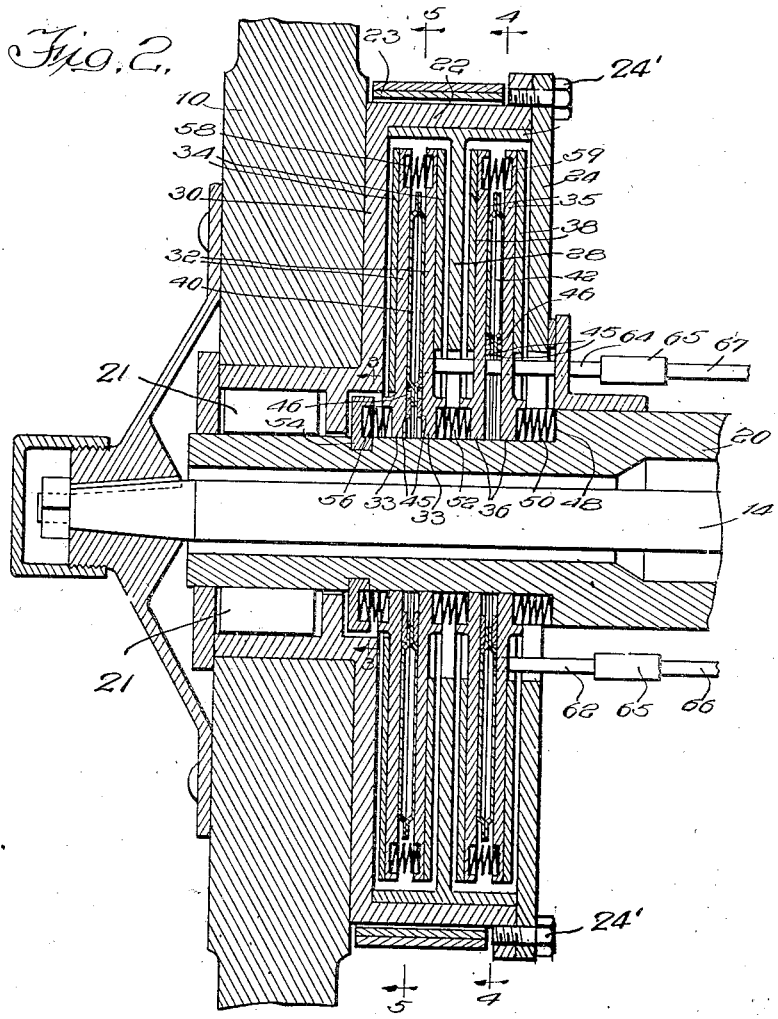
Fig. 2 is a diametrical section through one of the rear wheels of the motor vehicle illustrated in Fig. 1 showing the construction of the braking mechanism proper.
Figure 3:
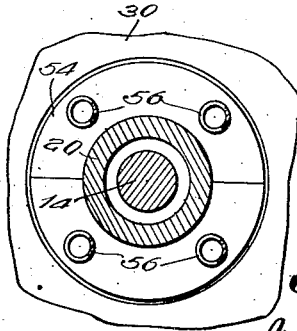
Fig. 3 is a detail section on the line 3—3 of Fig. 2.

In the embodiment of the invention selected for illustration, the rear wheels 10 are mounted on the running gear 12 in any suitable or preferred manner and power is transmitted to them through the live axles 14 from the power plant 15, by any of the transmission mechanisms well known in the art. The above mentioned devices are well known and, per se, form no part of the present invention, so that a detailed description of the same is deemed unnecessary here.

The front wheels 16 are mounted in the usual or any suitable or preferred manner on the front axle 18, all as well understood in the art.

Each of the rear wheels 10 is rotatably mounted on the stationary axle 20 by suitable means, such as roller bearings 21, and carries a drum 22 forming a housing for the braking mechanism. The usual emergency brake 23 may be arranged to grip the outside of the drum 22. A cover plate 100

24 fastened in place as by suitable bolts 24' completes the enclosure and the cover plate 24 and drum provide opposed annular friction surfaces with radial faces.

Fitting within the drum 22 and between the plate 24 and the radial wall of the drum is a ring member 26 having an annular radially extending web 28. The web 28 is disposed between the radial wall of the drum and the plate 24 and one side provides a friction braking surface in opposition to the radial wall of the drum 22 while the other side provides a friction braking surface in opposition to the cover plate 24.

Each brake comprises a pair of braking elements hereinafter to be described, one disposed between the radial wall of the drum 22 and the web 28, and the other disposed between the web and the cover plate 24. These braking elements are adapted to be expanded to cause friction with the drum, web and cover plate, all of which are fixed with respect to each other and turn with the wheel. The friction produced retards the rotation of the wheel 10 with respect to the axle 20.

Between the base or radial wall 30 of the drum 22 and the web 28 are a pair of spaced plates 32 suitably splined at 33 to the stationary axle 20 to prevent their rotation. Suitable friction facings 34 are carried by the plates 32.

The other brake element likewise comprises a pair of stationary plates 35 between the web 28 and the cover plate 24. The plates 35 are suitably splined at 36 to the stationary axle 20. Suitable friction facings 38 are carried by the plates 35 for braking engagement with the web 28 and plate 24.

The hydraulic means provided for expanding the plates 34 and 35 to apply the brake comprises, in this instance, a pair of thin, flat annular vessels 40 and 42, one between the plates 34 and the other between the plates 35. The walls of the vessels 40 and 42 which are preferably of suitable sheet metal, are sufficiently flexible to be expanded as pressure fluid is received therebetween. Each of the vessels 40 and 42 is in the form of an annulus adapted to receive pressure fluid between its walls and by its increase in thickness to increase the spacing between the plates 34 and 35 and force the facings 34 and 38 into frictional engagement with the drum 22, web 28 and cover 24.

The resilience of the walls of the vessels or diaphragms 40 and 42 is preferably sufficient to cause the diaphragm to contract when the inside pressure is reduced and the plates 32 and 35 may be suitably attached to the diaphragms as by means of rivets, to positively withdraw the plates and prevent the brakes from dragging.

The inner margins of the diaphragms 40 and 42 may be held securely in place by spring rings 45 and bolts 46.

The stationary axle 20 has a shoulder 48 and interposed between this shoulder and the adjacent plate 35 are a plurality of circumferentially spaced coiled springs 50. A similar group of springs 52 are interposed between the inner plates 35 and 36 and secured in a groove in the stationary axle 20 adjacent the wheel is a split ring 54 between which and the adjacent plates 33 are another group of similar springs 56.

Interposed between the outer ends of each pair of plates 32 and 35 are a group of circumferentially spaced coiled springs 58 and 59, respectively. The springs 58 and 59 may be held in position by providing pockets or recesses in the opposed surfaces of the plates 32 and 35 with the opposite ends of the springs engaging in these pockets or recesses as shown in Fig. 2. The springs 58 and 59 tend to separate the outer ends of the plates while the springs 50, 52 and 56 tend to move the inner ends of the plates together.

The pressure fluid may be delivered to the diaphragms 40 and 42 on each wheel, by means of a pair of tubes 62 and 64 (Fig. 2), which may be connected through suitable couplings 65 with the tubes 66 and 67 which lead to the pressure supply means. The tube 62 extends through the inner plate 35 and opens into the inner diaphragm 42.

To permit the tube 64 to reach the outer diaphragm without passing through the inner diaphragm, the inner margin of the inner diaphragm is preferably formed as indicated at 70 in Fig. 4 to provide a slot through which the tube 64 extends, the tube 64 passing through the plates 35 and through the inner plate 32 and opening into the outer diaphragm 40.

I have illustrated a suitable means actuated by the operator or driver for varying the fluid pressure in the tubes 66 and 67 and diaphragms 40 and 42 to apply the brakes.

In a four wheel brake system, each wheel of the vehicle is to be provided with two expansion diaphragms 40 and 42 and two pressure transmission pipes, one to each of these diaphragms. The front wheel brakes are substantially the same as the rear wheel brakes, so that the description of one of the rear brakes will suffice for all, it being understood that with the usual front wheels in which there is no drive transmitted thereto, the live axle will be omitted and the axle will be of the usual or any suitable or preferred form employed at the front.

Referring now to Figs. 6, 7 and 8, each diaphragm 40 is connected by a pressure transmission pipe 67 with a pressure cylinder 80. Each diaphragm 42 is connected by a pressure transmission pipe 66 with a pressure cylinder 82. There are eight diaphragms and eight pressure cylinders, two for each wheel and one cylinder for each diaphragm. For proper functioning of the brakes on all four wheels, these cylinders 80, 82 are preferably arranged in one group. In the embodiment illustrated, the cylinders 80, 82 are cut in a solid cylindrical block 83 and are arranged around the sides of a square with a central chamber of cylindrical form 84. The arrangement of the cylinders around the sides of a square is clearly shown in Fig. 7.

Operable in each cylinder is a plunger 86, each plunger 86 carrying a suitable piston 87. The plungers 86 are of the same form and size, making them interchangeable. They are joined together at their upper ends by a cross head 88, each plunger being provided adjacent the cross head with a shoulder 89 cooperable therewith. The upper reduced end of each plunger passes through the cross head 88 and is secured tightly to the cross head by suitable nuts 90.

The upper surface of the cross head 88 may be covered with a pad 91 of suitable material, such as iron, leather or rubber, as may be desired, which, with the cross head, forms the pedal of the brake. This pedal is disposed conveniently accessible to the driver's foot, as shown in Fig. 1 and as well understood in the art. The covering or pad 91 may be secured to the cross head 88 by screws 92 and the under surface of the pad is recessed to accommodate the nuts 90.

To operate the brakes, pressure is placed on the pedal 91 as by applying the foot thereto and depressing the pedal. This depresses the pressure plungers 86, forcing the pistons 87 downwardly into the cylinders 80, 82 and thus forcing the liquid in the system into the diaphragms 40, 42 through the pressure transmission pipes 66, 67 and the connections 62, 64. It is to be understood that in the operation of the device the diaphragms and connecting tubes and cylinders 80, 82 below the pistons 87 are all completely filled with a relatively incompressible fluid, such as oil. The additional fluid forced into the diaphragm by the displacement of the pistons 87 expands the diaphragms and forces the fixed braking surfaces 34 and 38 against the moving braking surfaces of the wheels, namely, against the wall 30 of the drum 22 and the web 28 and cover plate 24. The resulting friction retards and stops rotation of the wheel with respect to the axle 20.

To release the brakes, the pressure in diaphragms 40, 42 is reduced by removing the pressure or foot from the pedal and the pedal is returned to its initial position by a spring 93 interposed between the head of the block 83 and the pedal. The spring 93 is coiled around a central guide 94.

In order to prevent binding of the plungers in the cylinders 80, 82 and to equalize the pressure applied to the plungers from the pedal 91, the central guide 94 is attached to the cross head 88 and moves in the central chamber 84. This central guide 94 likewise serves to keep the plungers 86 in alignment. The spring 93 returns the plungers, central guide and pedal to the initial position on release of pressure, and the brake is therefore always ready to function. To prevent undue pressure on the plungers, the pressure on the guide 94 is provided with a shoulder 95 which engages a shoulder of similar form at the upper end of the central chamber 84.

In order to prevent leakage of the fluid from the heads of the cylinders 80, 82, the upper ends of the cylinders are closed by a cylinder head 96 and a suitable gasket 97, which are held closely to the top of the cylinder block by suitable screws 96' as shown in Figure 7. The cylinder head 96 is provided with a stuffing box 98 for each plunger 86, these stuffing boxes carrying the packing material 99 for preventing leakage of fluid around the plungers 86 and each stuffing box is provided with a suitable stuffing or gland nut 100 for clamping the packing about the plunger.

The upper end of the central guide 94 is fastened to the cross head 88 by the screw thread on its upper end and the lock nuts 102. The cross head distributes the pressure on the pedal evenly over all of the plungers. If one cylinder, pressure transmisson pipe or diaphragm leaks or ruptures, the pressure to the other plungers is not effected. This insures even braking power at all times. If one diaphragm of the wheel fails or is disabled, the brake on that wheel is operated by the other diaphragm.

The pistons 87 are threaded upon the lower ends of the plungers 86, as shown in Fig. 8. The pistons are preferably close fitting. There will, nevertheless, be some leakage past the pistons to their upper sides and for the purpose of draining this fluid off and preventing its interfering with the return of the pedal to its initial position when pressure is released, a channel 105, chamber 106 and outlet 107 are provided to permit the passage of this fluid back to the lower sides of the pistons. When pressure is placed on the pedal, the ball valves 108 are pressed up and close the channel 105 and prevent the passage of any liquid to the upper sides of the pistons. When the pressure on the pedal is released and the plungers are forced up by the spring 93, the ball valves 108 are pressed down and open the channels 105 and the liquid above the piston passes around the ball valves 108 and returns to its proper place below the pistons.

A filler hole or opening 112 is provided for each cylinder 80, 82. These openings 112 may be closed by suitable tap screws 112'. A suitable collar 114 or other means may be provided for attaching the cylinder block to the floor of the car or to the chassis of the vehicle.

In the embodiment of Fig. 9 the two diaphragms 40' and 42', instead of one being placed between two plates and another between another set of plates, both are placed together between a single pair of plates 120, 121, splined upon the stationary axle 20'. This dispenses with two braking surfaces and increases the effective braking area in substantially the same space, but separate pipes 62' and 64' are employed as before, one for each of the diaphragms 40' and 42'. Each diaphragm 40' and 42' is preferably expandible sufficiently to apply the brake plates 120 and 121 when the other diaphragm is deflated, the expanding or operative diaphragm operating on one side thru the deflated diaphragm and the relatively great expansion of each diaphragm overcoming any neutralizing tendency set up by the deflation of one diaphragm. Consequently, upon the rupture, leakage or failure of either diaphragm or either pipe line, the brake at that wheel will be operated or applied by the other diaphragm and pipe line, so that the operator will be better assured of having an operative brake at hand at all times.

I claim:—

1. In combination, a rotatable vehicle wheel, a pair of radially extending members rotatable with said wheel, an intermediate member disposed between and rotatable with said first members, a fixed axle member, a pair of brake members disposed between said intermediate member and one of said first members and adapted to be separated into braking engagement therewith, a second pair of brake members disposed between the intermediate member and the other of said first members and adapted to be separated into braking engagement therewith, a pair of resilient diaphragms, one between each pair of said brake members, said diaphragms being expanded by pressure applied to them to force said brake members into frictional engagement with said first radially extending and intermediate members.

2. In combination, a rotatable vehicle wheel, a fixed axle member, brake drum means rotatable with respect thereto, annular brake members within said drum longitudinally movable but non-rotatable with respect to said fixed axle member, and a pair of resilient annular diaphragms between said brake members, said diaphragms being expanded by pressure applied to them to force said brake members into frictional engagement with said brake drum means.

3. In combination, a fixed axle member, a vehicle wheel rotatable thereon, brake drum means carried by and rotatable with the wheel and having two outer walls and an intermediate wall all radially disposed with respect to the axis of rotation of said wheel, a pair of brake discs between the intermediate wall and one outer wall, a pair of brake discs between the intermediate wall and the other outer wall, said brake discs being axially slidable and held against rotation on said axle, a pair of resilient annular diaphragms, one between each pair of brake discs, said diaphragms being expanded by an application of pressure to them to force said axially slidable brake discs into frictional engagement with the radial brake walls carried by the wheel and separate pressure connections leading to each of said diaphragms.

4. In combination with a stationary axle, a wheel mounted thereon and rotatable thereabout, a cup-like brake drum attached to said wheel, a plate having a flange disposed on the inside face of said drum and a web projecting radially inward from the flange into juxtaposition to said axle, a cover bolted to said drum and bearing against said flange, said drum, web and cover forming radial braking surfaces disposed parallel to each other and at right angles to the axle, a pair of braking discs fitted between said drum and web, a second pair of braking discs fitted between said web and cover, said discs being slidable on said axle and keyed against rotation thereon, and means for moving said discs into frictional engagement with said drum, web and cover respectively.

5. In combination, four vehicle wheels, a pair of separate service brakes at each wheel for braking the movement thereof, a single foot operated actuator for developing fluid pressure and separate pressure lines separately connecting said single pressure actuator with each of said service brakes for operating each service brake independently of the other service brake at the same wheel and independently of the service brakes at the other wheels, said single foot operated actuator simultaneously developing fluid pressure in all said fluid lines for operating all said brakes in the normal service braking of the vehicle and each of the two service brake connections to each wheel being adapted for separately conducting fluid under pressure to its brake in case of failure of the other service brake for the same wheel or the connections thereto whereby a braking of each wheel is assured in spite of failure of one of the service brakes therefor or one of the operating connections thereto.

6. In combination, four vehicle wheels, a pair of separate service brakes at each wheel for braking the movement thereof, each of said service brakes including a resilient annular diaphragm, a single foot operated actuator for developing fluid pressure, separate pressure lines separately connecting said single pressure actuator with each of said diaphragms for operating each service brake independently of the other service brake at the same wheel and independently of the service brakes at the other wheels, said single foot operated actuator simultaneously developing fluid pressure in all said fluid lines for operating all said brakes in the normal service braking of the vehicle and each of the two service brake connections to the diaphragms of each wheel being adapted for separately conducting fluid under pressure to its diaphragm in case of failure of the other diaphragm for the same wheel or the connections thereto whereby a braking of each wheel is assured in spite of failure of one of the diaphragms therefor or one of the operating connections thereto.

7. In combination, four vehicle wheels, a pair of separate service brakes at each wheel for braking the movement thereof, each of said service brakes including a resilient annular diaphragm, a single foot operated actuator for developing fluid pressure, separate pressure lines separately connecting said single pressure actuator with each of said diaphragms for operating each service brake independently of the other service brake at the same wheel and independently of the service brakes at the other wheels, said single foot operated actuatod simultaneously developing fluid pressure in all said fluid lines for operating all said brakes in the normal service breaking of the vehicle and each of the two service brake connections to each wheel being adapted for separately conducting fluid under pressure to its diaphragm in case of failure of the other diaphragm for the same wheel or the connections thereto whereby a braking of each wheel is assured in spite of failure of one of the diaphragms therefor, or one of the operating connections thereto, and a plurality of radially disposed brake members at each wheel one between each pair of diaphragms and one adjacent the outer side of each of said diaphragms.

8. In combination, a vehicle wheel, a pair of brake operating diaphragms at said wheel, and a plurality of brake members rotatable with the wheel, one of said brake members being disposed between said diaphragms and one on the outer side of each of said diaphragms.

9. In combination, a vehicle wheel, a pair of brake operating diaphragms at said wheel, a plurality of brake members rotatable with the wheel, one of said brake members being disposed between said diaphragms and one on the outer side of each of said diaphragms, and fluid pressure means for actuating said diaphragms to apply a braking action upon the intermediate and outer brake members.

10. In combination, a vehicle wheel, a pair of brake operating diaphragms at said wheel, a plurality of brake members rotatable with the wheel, one of said brake members being disposed between said diaphragms and one on the outer side of each of said diaphragms, fluid pressure means for actuating said diaphragms to apply a braking action upon the intermediate and outer brake members, and means for normally releasing the braking action of said diaphragms upon said brake members.

11. In combination, a vehicle wheel, a pair of brake operating diaphragms at said wheel, a plurality of brake members rotatable with the wheel, one of said brake members being disposed between said diaphragms and one on the outer side of each of said diaphragms, and cooperating brake members fixed against rotation with the wheel and one disposed on each of the opposite sides of each of said diaphragms and operated into braking engagement with said first brake members by said diaphragms.

12. In combination, a vehicle wheel, a pair of brake operating diaphragms at said wheel, a plurality of brake members rotatable with the wheel, one of said brake members being disposed between said diaphragms and one on the outer side of each of said diaphragms, cooperating brake members fixed against rotation with the wheel and one disposed on each of the opposite sides of each of said diaphragms and operated into braking engagement with said first brake members by said diaphragms, and spring means disposed between the two intermediate fixed brake members and adjacent the outer fixed brake members for normally releasing said fixed brake members from braking cooperation with the brake members rotatable with the wheel.

In witness whereof, I hereunto subscribe my name this 27th day of December, 1926.

HARRY A. MUSHAM.